W. I. BEST & S. H. SHEPARD.
TRACTOR.
APPLICATION FILED SEPT. 12, 1916.
1,230,655.
Patented June 19, 1917.
3 SHEETS—SHEET 2.
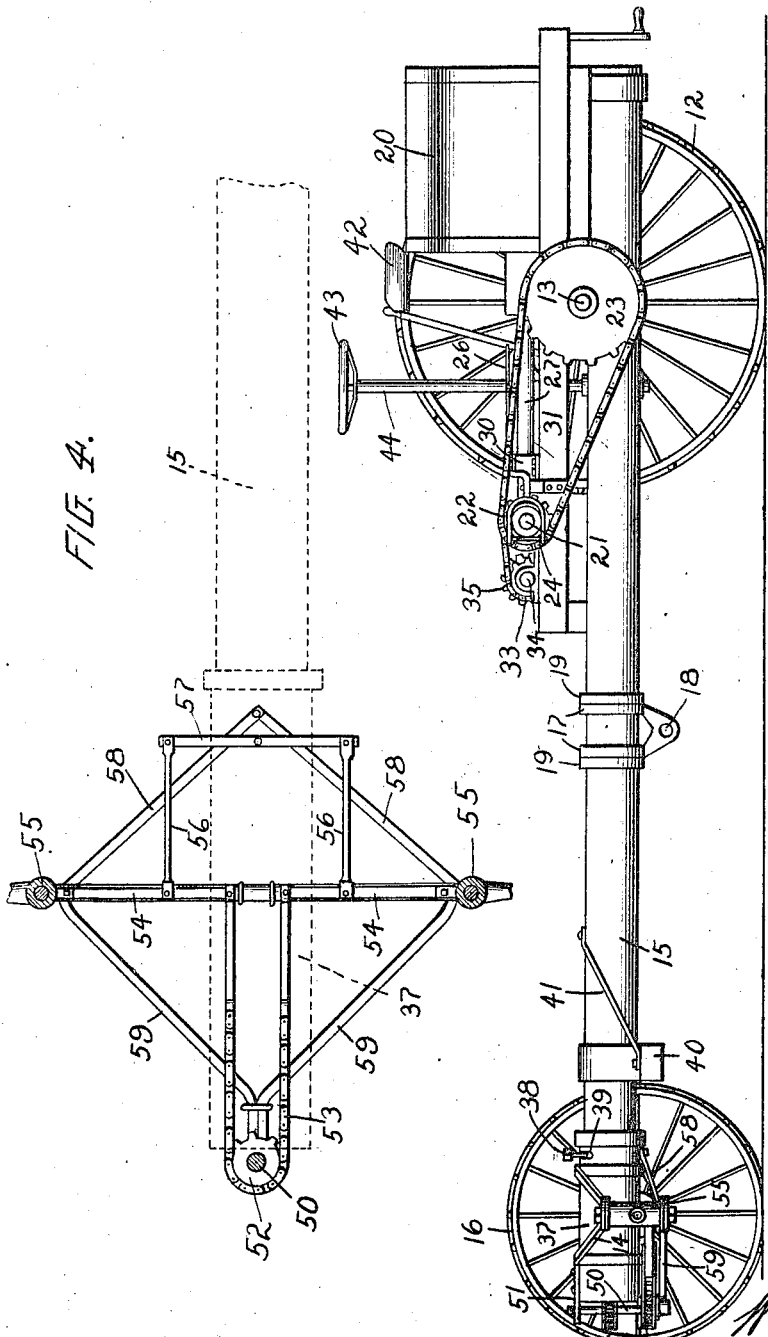
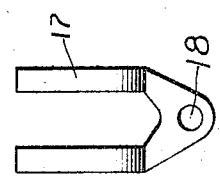

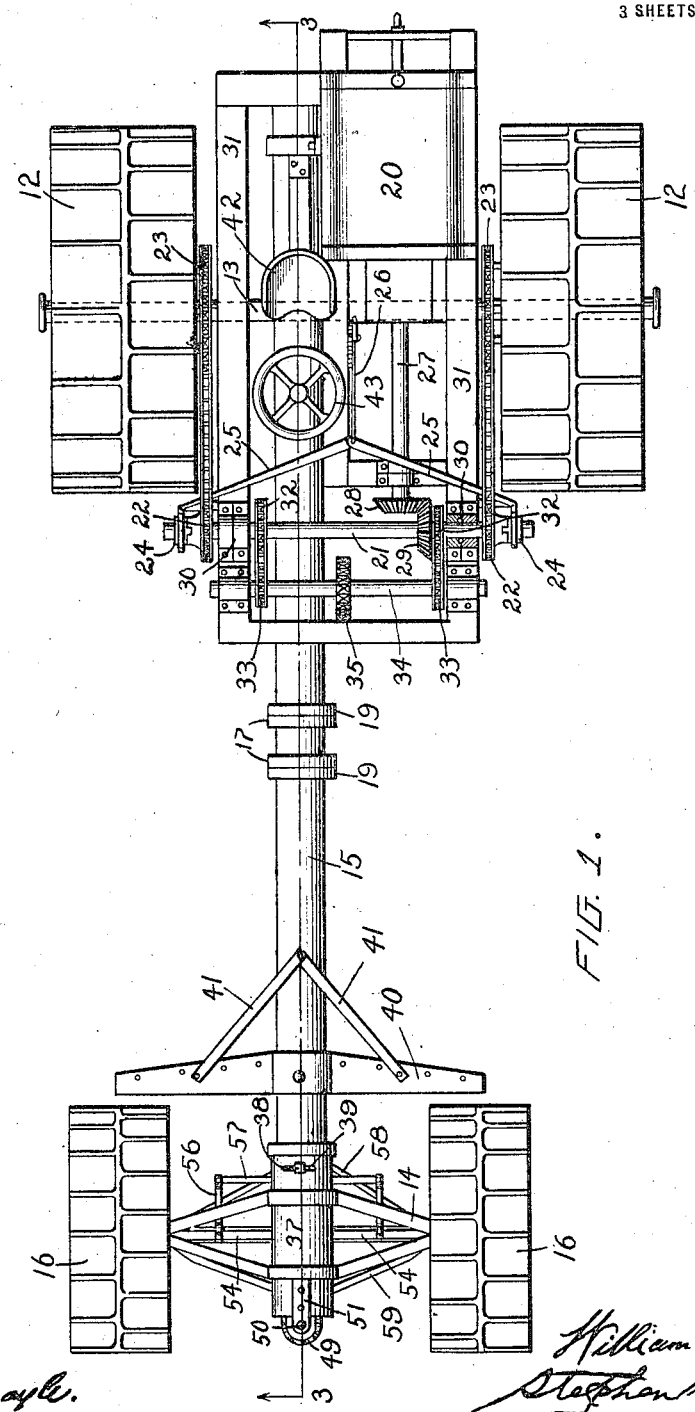

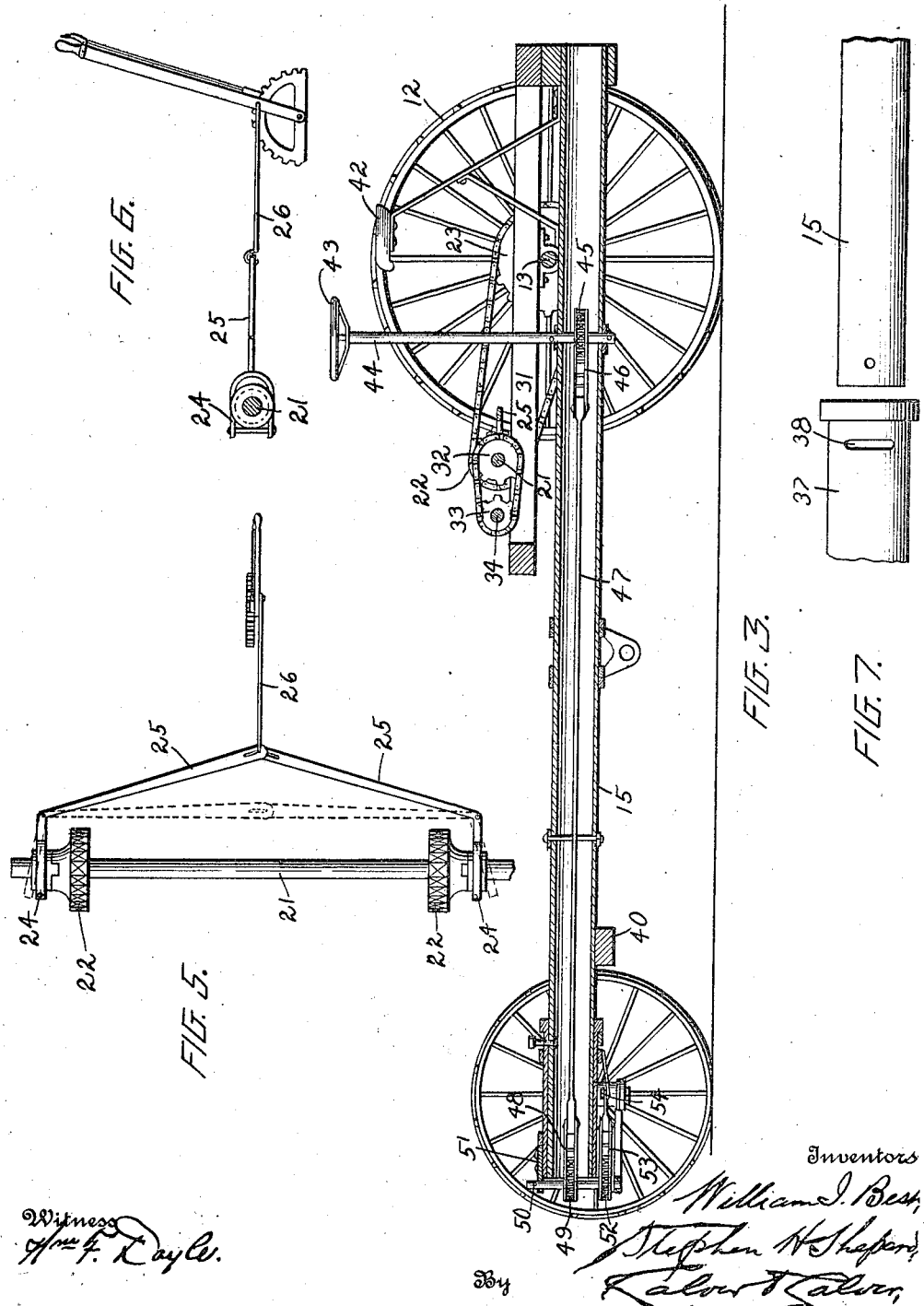

UNITED STATES PATENT OFFICE.

WILLIAM I. BEST AND STEPHEN H. SHEPARD, OF McLEANSBORO, ILLINOIS.

TRACTOR.

1,230,655.  Specification of Letters Patent.  Patented June 19, 1917.

Application filed September 12, 1916. Serial No. 119,636.

*To all whom it may concern:*

Be it known that we, WILLIAM I. BEST and STEPHEN H. SHEPARD, citizens of the United States, residing at McLeansboro, in the county of Hamilton and State of Illinois, have invented or discovered certain new and useful Improvements in Tractors, of which the following is a specification, reference being had therein to the accompanying drawings.

This invention has for its object to provide a simple and efficient tractor adapted for use in farm work but more especially intended for use in connection with binders or harvesters in running on wet or miry ground, as in harvesting rice, although the tractor is of such construction that it may be used for plowing and other kinds of farm work. To this end the improved tractor, which runs on four wheels, comprises a one-piece tubular frame or reach connecting the axles of the front and rear wheels, and through which tubular frame or reach the steering connections preferably run from the rear part of the tractor to the wheels of the forward axle. This tubular reach or one-piece frame is provided with means whereby it may engage the bull wheel shaft of the harvester, and thus propel the harvester, the grain wheel of the harvester running on the ground. The harvester mechanism is driven from a motor mounted on the tractor and which motor also drives the tractor, but connections are afforded whereby the tractor driving gear may be thrown out while the harvester mechanism still continues to run, so as to avoid clogging in heavy grain. In other words, the locomotion of the tractor may be arrested, if desired, when working in heavy grain, while the harvester mechanism may still continue to run.

In the accompanying drawing Figure 1 is a plan view of the improved tractor. Fig. 2 is a side view and Fig. 3 a longitudinal section of the same. Fig. 4 is a detail view of a part of the steering mechanism. Figs. 5 and 6 are detail views of the mechanism for throwing the tractor driving mechanism in and out. Fig. 7 is a detail view showing parts of the reach or one-piece frame and the sleeve which is to be loose thereon. Fig. 8 is a detail view of the yoke which is adapted to receive the bull-wheel shaft of a binder or harvester.

Referring to the drawings, the improved tractor comprises wide rear wheels 12, mounted on the rear axle 13, these rear wheels being of course the propelling wheels of the tractor. For working on miry ground, as in harvesting rice, the rear wheels 12 will preferably have a width of about thirty inches, while for use on harder ground, as in harvesting wheat, rear wheels having a width of twenty inches will preferably be provided. The rear axle 13 is connected with a front axle frame 14 by a tubular one-piece frame or reach 15 consisting preferably of a steel pipe about five inches in diameter.

The front wheels 16 have knuckle connections, similar to those in general use in motor cars, with the front axle frame 14 so that they may be turned to different angles relative to the tubular reach 15, for the purpose of steering the tractor. Loosely hung upon the middle portion of the tubular reach or one-piece 15 is a yoke 17 provided with an opening 18 adapted to receive the bull wheel shaft of a binder, and endwise movement of said yoke on said shaft is prevented by collars 19 fixed to said shaft on opposite sides of said yoke. This loosely hung yoke will permit a certain freedom of movement of the binder so that the latter may accommodate its movements to uneven ground.

The tractor will preferably be driven by an internal combustion engine suitably mounted on the tractor in a housing 20, the engine shaft being suitably geared to a main driving shaft 21 provided with loose sprocket wheels 22 having sprocket chain connections with sprocket wheels 23 on the rear axle 13 to which the driving wheels 12 are affixed, for the purpose of driving the tractor. The shaft 21 is preferably made in two parts like the rear axle of a motor car. The sprocket wheels 22 are loosely mounted on the shaft 21 but may be operatively connected with said shaft by means of sliding clutch collars 24 splined to said shaft and thus rotating therewith, the said collars being operated by means of bell-crank levers 25, to throw them into or out of engagement with the sprocket wheels 22 which are held, in any suitable manner, from endwise movement on the shaft 21, thus throwing the tractor driving gear in or out.

The levers 25 are jointed to a rod 26 which may be operated by the driver to throw the clutch collars 24 into or out of engagement with the hubs of sprocket wheels 22. The engine transmission gearing is connected with the main driving shaft 21 by a shaft 27 having at its forward end a bevel pinion 28 meshing with a bevel gear 29 fixed to the main driving shaft 21 which is preferably journaled in ball-bearings at 30 on parts of the tractor frame 31.

Fixed to the driving shaft 21 are sprocket-wheels 32 having chain connections with sprocket wheels 33 on a harvester driving shaft 34 mounted in the tractor frame 31 and which shaft 34 is operatively connected with the harvester mechanism, as through a sprocket wheel 35 fixed to said shaft 34.

The tubular one-piece frame or reach 15 is received at its forward end in a sleeve 37 which is fixed to the front axle frame 14, but which sleeve 37 is loosely connected with said frame or reach by a pin or bolt 38 passing through the said one-piece frame 15, said pin or bolt 38 extending through a transverse slot 39 in the said sleeve 37. This construction affords a loose transverse connection of the front axle frame 14 with the tubular one-piece frame 15 so that the front wheels 16 may accommodate themselves to uneven ground.

Rigidly secured to the one-piece frame 15 is a plow-hitch 40 which will preferably be braced to said frame by rods or bars 41 attached at their opposite ends to the said frame and plow-hitch. It will be noted that there is a liberal clearance between the one-piece frame 15 and the ground, so that there is plenty of room beneath said frame for plows or other ground-working tools which may be mounted on the tractor by means of the plow-hitch referred to.

Conveniently adjacent to a seat 42 for the driver is a steering wheel 43 at the top of a steering shaft 44 mounted on the one-piece tubular frame 15 and provided, within said frame, with a sprocket wheel 45 around which passes a chain 46 the opposite ends of which are connected to rods 47 housed in the said tubular frame 15. The said rods 47 are connected at their forward ends to a chain 48 passing around a sprocket wheel 49 fixed to a vertical shaft 50 mounted in brackets or bars 51 on the sleeve 37 and provided, below the said tubular frame 15, with a second sprocket wheel 52 around which passes a chain 53 the opposite ends of which are connected to steering levers 54 connected to the front wheels 16 in such a manner as to turn the said wheels on their vertical pivots or knuckles 55. The steering levers 54 may be steadied in any suitable manner, as by connections 56 jointed to said levers and to a lever 57 pivoted on the tubular one-piece frame, and the rods 58 which are attached together and to the front axle frame. The vertical shaft 50 will preferably be braced to a front axle frame bar by means of rods 59.

From the foregoing it will be understood that the invention provides a simple and effective tractor adapted to propel a harvester, and also adapted for use in other farm work. It will also be understood that in propelling a harvester in heavy grain, where there is sometimes likely to be trouble from clogging, the tractor may be thrown out, so as to suspend its locomotion temporarily, while the harvester mechanism may continue to run, to clear the cutter bar. Also, in this improved tractor, side draft will be reduced to a minimum, owing to the balanced gearing connections hereinbefore described on opposite sides of the central one-piece frame or reach 15, between the main driving shaft and both the tractor shaft and the harvester driving shaft. In practice a radius rod will preferably be used to connect the left end of the rear axle to the back of the binder frame, and this will largely assist in preventing side draft.

Having thus described our invention we claim and desire to secure by Letters Patent:—

1. A tractor comprising four wheels, forward and rear axle parts supported by said wheels, a tubular one-piece frame or reach connecting said axle parts, combined with driving mechanism for the rear wheels of the tractor, steering mechanism for said tractor, and connections, through said tubular one-piece frame or reach, between the rear and forward parts of said steering mechanism.

2. A tractor having a frame part provided with means for engaging the bull-wheel shaft of a harvester, combined with a single main driving shaft mounted on the tractor frame, a single engine for operating said shaft, a harvester-mechanism driving-shaft also mounted on the tractor frame and operatively connected with said main driving shaft, means for operating said main driving shaft, rear driving wheels on the tractor, and disconnectible connections between said main driving shaft and the said driving wheels of the tractor; whereby the harvester driving shaft may continue to run when the tractor driving mechanism is thrown out.

3. A tractor comprising four wheels, forward and rear axle parts, a one-piece frame or reach connecting said forward and rear axle parts, and a loosely mounted yoke carried by said one-piece frame or reach and having means for engaging the bull-wheel shaft of a harvester.

4. A tractor comprising four wheels, forward and rear axle parts, a one-piece frame or reach connecting said forward and rear axle parts, and a loosely mounted yoke carried by said one-piece frame or reach and having means for engaging the bull-wheel shaft of a harvester, said one-piece frame or reach being also provided with a plow-hitch.

5. A tractor comprising four wheels, forward and rear axle parts, a tubular one-piece frame or reach connecting said forward and rear axle parts, a sleeve rigid with the front axle part and loosely receiving the forward end of said tubular one-piece frame or reach, and a loosely mounted yoke carried by said one-piece frame or reach and having means for engaging the bull-wheel shaft of a harvester.

6. A tractor comprising forward and rear wheels and a suitable frame comprising a central reach between the forward and rear frame parts, combined with a main driving shaft mounted on said frame, means for operating said shaft, a harvester mechanism driving shaft also mounted on said frame, and driving connections between said shaft on opposite sides of said central reach.

7. A tractor comprising forward and rear wheels and a suitable frame comprising a central reach between the forward and rear frame parts, combined with a main driving shaft mounted on said frame, means for operating said shaft, a harvester mechanism driving shaft also mounted on said frame, driving connections between said shaft on opposite sides of said central reach, and disconnectible connections, also on opposite sides of said central reach, between said main driving shaft and the rear driving wheels of the tractor.

In testimony whereof we affix our signatures.

WILLIAM I. BEST.
STEPHEN H. SHEPARD.